(12) United States Patent
Dickson, Jr. et al.

(10) Patent No.: US 10,493,412 B2
(45) Date of Patent: Dec. 3, 2019

(54) BLENDING SYSTEMS AND METHODS WITH BLADE ASSEMBLY DAMPENING

(71) Applicant: BlendTec, Inc., Orem, UT (US)

(72) Inventors: Thomas D. Dickson, Jr., Orem, UT (US); Joseph O. Jacobsen, American Fork, UT (US); Mark W. McLane, Lehi, UT (US); Sterling O. Kingdon, Cedar Hills, UT (US)

(73) Assignee: BlendTec, Inc., Orem, UT (US)

( * ) Notice: Subject to any disclaimer, the term of this patent is extended or adjusted under 35 U.S.C. 154(b) by 647 days.

(21) Appl. No.: 14/710,442

(22) Filed: May 12, 2015

(65) Prior Publication Data

US 2016/0331181 A1    Nov. 17, 2016

(51) Int. Cl.
| | |
|---|---|
| *A47J 43/07* | (2006.01) |
| *B01F 7/00* | (2006.01) |
| *B01F 15/00* | (2006.01) |
| *B01F 7/16* | (2006.01) |
| *A47J 43/046* | (2006.01) |

(52) U.S. Cl.
CPC ......... *B01F 7/0025* (2013.01); *A47J 43/0722* (2013.01); *B01F 7/00141* (2013.01); *B01F 7/00275* (2013.01); *B01F 7/162* (2013.01); *B01F 2015/0011* (2013.01); *B01F 2015/00084* (2013.01); *B01F 2215/0026* (2013.01)

(58) Field of Classification Search
CPC ............................ A47J 43/0722; A47J 43/046
See application file for complete search history.

(56) References Cited

U.S. PATENT DOCUMENTS

| | | | | |
|---|---|---|---|---|
| 2,585,255 A | * | 2/1952 | Kochner | A47J 43/046 241/282.1 |
| 2,750,162 A | * | 6/1956 | Kircher | A47J 43/07 220/632 |

(Continued)

FOREIGN PATENT DOCUMENTS

| | | |
|---|---|---|
| CN | 203041975 U | 7/2013 |
| CN | 204071835 U | 1/2015 |

(Continued)

OTHER PUBLICATIONS

PCT International Search Report for International Application No. PCT/US2016/030406, dated Jul. 29, 2016.

*Primary Examiner* — Tony G Soohoo
*Assistant Examiner* — Elizabeth Insler
(74) *Attorney, Agent, or Firm* — Dorsey & Whitney LLP

(57) ABSTRACT

Blender and food processing devices dampen impact forces between a blending blade and a blending jar. One blender includes a blender base and a blending jar that has a seal opening. A blending blade assembly in the jar includes a blending blade, a jar shaft attached to the blending blade and extending through the seal opening, a circular motion guide positioned around the jar shaft, and a jar seal positioned between the circular motion guide and the seal opening. The jar seal prevents contact between the circular motion guide and the seal opening and dampens forces induced by relative motion between the seal opening and the blending blade, jar shaft, and/or circular motion guide. The dampening may reduce wear or damage to the jar and may improve quality of the blending jar and blade assembly.

14 Claims, 14 Drawing Sheets

(56) References Cited

U.S. PATENT DOCUMENTS

| | | | |
|---|---|---|---|
| 3,064,949 A * | 11/1962 | Dewenter | A47J 43/046 241/195 |
| 3,493,215 A * | 2/1970 | Edwards | A47J 43/046 241/282.2 |
| 4,696,417 A | 9/1987 | Ugolini | |
| 4,900,158 A | 2/1990 | Ugolini | |
| 5,615,952 A | 4/1997 | Cocchi | |
| 5,653,118 A | 8/1997 | Cocchi et al. | |
| 5,655,834 A | 8/1997 | Dickson | |
| 5,713,214 A | 2/1998 | Ugolini | |
| 5,735,602 A | 4/1998 | Salvatore | |
| 5,906,105 A | 5/1999 | Ugolini | |
| 6,058,721 A | 5/2000 | Midden et al. | |
| 6,149,035 A | 11/2000 | Gorski et al. | |
| 6,286,724 B1 | 9/2001 | Midden | |
| 6,430,952 B1 | 8/2002 | Midden et al. | |
| 6,446,835 B1 | 9/2002 | Ford | |
| 6,467,944 B2 | 10/2002 | Ugolini | |
| 6,546,843 B2 | 4/2003 | Ugolini | |
| 6,619,056 B2 | 9/2003 | Midden et al. | |
| 6,705,106 B1 | 3/2004 | Cunha et al. | |
| 6,712,237 B2 | 3/2004 | Medina et al. | |
| 6,745,592 B1 | 6/2004 | Edrington et al. | |
| 6,754,876 B2 | 6/2004 | Sasaki et al. | |
| 6,766,650 B2 | 7/2004 | Cunha et al. | |
| 6,845,703 B2 | 1/2005 | Ugolini | |
| 6,854,876 B2 | 2/2005 | Dickson, Jr. | |
| 6,863,916 B2 | 3/2005 | Henriksen et al. | |
| 6,910,348 B2 | 6/2005 | Ugolini | |
| 6,918,258 B2 | 7/2005 | Cunha et al. | |
| 6,979,117 B2 | 12/2005 | Dickson, Jr. | |
| 6,986,441 B2 | 1/2006 | Scordato et al. | |
| 7,100,392 B2 | 9/2006 | Cortese | |
| 7,140,196 B2 | 11/2006 | Pfeifer et al. | |
| 7,152,765 B1 | 12/2006 | Midden et al. | |
| 7,278,276 B2 | 10/2007 | Boyer et al. | |
| 7,281,842 B2 | 10/2007 | Dickson, Jr. | |
| 7,299,944 B2 | 11/2007 | Roady et al. | |
| 7,712,321 B2 | 5/2010 | Kadyk | |
| 8,123,075 B2 | 2/2012 | Kadyk | |
| 8,157,117 B2 | 4/2012 | Grampassi | |
| 8,404,166 B2 | 3/2013 | Cocchi et al. | |
| 8,561,839 B2 | 10/2013 | Cocchi et al. | |
| 8,714,410 B2 | 5/2014 | Wadle et al. | |
| 8,887,958 B2 | 11/2014 | Kadyk et al. | |
| 8,899,063 B2 | 12/2014 | Ugolini | |
| 2003/0200870 A1 | 10/2003 | Cocchi et al. | |
| 2004/0226305 A1 | 11/2004 | Grampassi | |
| 2007/0017234 A1 | 1/2007 | Moulder et al. | |
| 2007/0242562 A1 | 10/2007 | Huang | |
| 2011/0011887 A1 | 1/2011 | Zaniboni et al. | |
| 2011/0101039 A1 | 5/2011 | Cocchi et al. | |
| 2011/0120163 A1 | 5/2011 | Wadle et al. | |
| 2011/0256617 A1 | 10/2011 | Cocchi et al. | |
| 2012/0055189 A1 | 3/2012 | Sipp et al. | |
| 2012/0199608 A1 | 8/2012 | Cocchi et al. | |
| 2013/0014650 A1 | 1/2013 | Cocchi et al. | |
| 2013/0098098 A1 | 4/2013 | Ugolini | |
| 2013/0152620 A1 | 6/2013 | Ugolini | |
| 2013/0263747 A1 | 10/2013 | Ugolini | |
| 2013/0269381 A1 | 10/2013 | Cocchi et al. | |
| 2013/0327080 A1 | 12/2013 | Sipp et al. | |
| 2014/0239107 A1 | 8/2014 | Upston et al. | |
| 2014/0295044 A1 | 10/2014 | Cocchi et al. | |
| 2014/0332560 A1 | 11/2014 | Sipp et al. | |
| 2014/0356494 A1 | 12/2014 | Cocchi et al. | |

FOREIGN PATENT DOCUMENTS

| | | |
|---|---|---|
| EP | 2478774 A1 | 7/2012 |
| EP | 2865304 A1 | 4/2015 |
| WO | 2007112479 A1 | 10/2007 |

* cited by examiner

US 10,493,412 B2

BLENDING SYSTEMS AND METHODS WITH BLADE ASSEMBLY DAMPENING

TECHNICAL FIELD

The present disclosure generally relates to dampening seals and blending apparatus and specifically to systems and methods for dampening a blending blade assembly relative to a blending jar.

BACKGROUND

Food processors and blending machines are being used now more than ever, particularly in the high-volume commercial beverage industry. People are increasingly becoming aware of the benefits, in terms of taste and quality, of well-processed beverages and other blended foods. Blended fruit smoothies and similar fruit drinks made with a food processor or blending machine are popular with all types of people, including fitness conscious and more casual consumers. Powerful blenders are also regularly used to make sauces, dips, dressings, nut butters, soups, and a variety of other foods.

Cold beverages, in particular, which have fruit (frozen or fresh) and ice ingredients to prepare, present unique challenges in beverage preparation. An appropriate blending machine will break down the ice, fruit, and other ingredients in an attempt to achieve an ideal uniform drink consistency.

In addition to the recent increase in the popularity of smoothies, food processors and blending machines are being used to produce many new and different beverages. For example, different types of coffees, shakes, dairy drinks, and the like are now commonly served at many different types of retail business locations. Consumers are demanding more diversity and variety in the beverages available at these smoothie and other retail stores. The keys to producing a high quality beverage, irrespective of the specific type of beverage, are quality ingredients and a high quality blending machine that will quickly and efficiently blend the ingredients to produce a drink with uniform consistency over a large number of duty cycles. Recent years have also seen a rise in residential ownership of high-powered blenders to allow consumers to enjoy these products at home.

One issue associated with businesses that depend on blending machines is the speed with which the beverage or drink is prepared. In the food preparation industry, time equals money. Beverages have traditionally been made by retrieving the appropriate ingredients, placing the ingredients inside a mixing container, and actuating a motor which drives a blade mounted inside the mixing container to blend the contents held within the mixing container. Each second of time wasted, even a fraction of a second of time wasted, adds up over time to significant amounts of money lost for any commercial operation. Residential users also use high speed settings to speed up production, create a smoother product, and minimize the duration of associated noise. Thus, blending blades are frequently rotated at high speeds for economic reasons as well as to improve the end user's experience.

Over time, blending at high speeds and high power levels can be abusive and even destructive to a blending jar and blade assembly. Repeated impact of the blade against frozen or other hard ingredients in the jar induces strong vibrations and resultant forces in the blade shaft, bearings, and other parts of the blade assembly. This energy must be dissipated by transmission through the jar and/or base of the blender in ways that can cause danger or damage. Accordingly, improvements to food processors and blending apparatus are needed to improve their durability, safety, and quality.

SUMMARY

One aspect of the present disclosure relates to a blender configured to dampen impact forces between a blending blade and a blending jar. The blender may comprise a blender base and a blending jar mounted to the blender base. The blending jar may have a seal opening. A blending blade assembly may also be included that has a blending blade configured to rotate in the blending jar, a jar shaft attached to the blending blade and extending through the seal opening, a circular motion guide positioned around the jar shaft, and a jar seal positioned between the circular motion guide and the seal opening. The jar seal may prevent contact between the circular motion guide and the seal opening and may dampen forces induced by relative motion between the seal opening and the blending blade, jar shaft, and/or circular motion guide. A motor may be in the blender base that is configured to drive the jar shaft to rotate the blending blade in the blending jar.

The seal opening may be positioned at a bottom end of the blending jar. A circular motion guide housing may also be included that is positioned between the circular motion guide and the jar seal. The circular motion guide housing may have an annular groove, and the jar seal may be positioned in the annular groove. The jar seal may have a plurality of protrusions extending from a surface on the jar seal.

In some embodiments, the blending blade, jar shaft, and circular motion guide are rigid relative to each other. The blending jar may have an inner surface at the seal opening and an outer surface at the seal opening, and the jar seal may extend into contact with the inner surface and the outer surface. The blending jar may have an upward surface at the seal opening and a downward surface at the seal opening, and the jar seal may extend into contact with the upward surface and the downward surface.

The jar seal may be annular and may comprise a contact surface contacting the seal opening, the contact surface comprising a groove.

The jar seal may also comprise a first jar seal and a second jar seal, the first jar seal being spaced from the second jar seal. The jar seal may include a plurality of protrusions extending from a surface on the jar seal contacting the seal opening.

The blending jar may also have an annular groove around the seal opening, with the jar seal being seated in the annular groove. In another embodiment, the blending jar comprises an upper annular groove and a lower annular groove, with the jar seal being seated in the upper and lower annular grooves.

In another case, the blending jar comprises a post with the seal opening extending through the post. The post may have a top surface and a bottom surface, wherein the jar seal covers the top and bottom surfaces of the post.

Another aspect of the disclosure relates to a peripherally-dampened blending blade assembly that includes a drive shaft, a blending blade attached to an end of the drive shaft and configured to rotate with the drive shaft, a circular motion guide positioned around the drive shaft, and a flexible seal positioned around the circular motion guide. The flexible seal may comprise a dampening material and many be configured to contact a blending jar.

This blending blade assembly may further comprise a housing positioned between the circular motion guide and the flexible seal. A circular motion guide seal may be positioned between the jar shaft and the housing, with the circular motion guide seal sealing the circular motion guide. A housing may be positioned external to the flexible seal.

Other embodiments may include a method of dampening impact forces between a blending blade assembly and a blending jar. For example, one method may comprise providing a blending jar that has a bottom opening, positioning a blade assembly in the bottom opening, wherein the blade assembly includes a blade positioned within the blending jar, a jar shaft extending through the bottom opening and attached to the blade, and a circular motion guide positioned around the jar shaft, and dampening relative movement between the blade assembly as a whole and the blending jar.

A dampening member may be positioned between the blending jar and the blade assembly that may dampen the relative movement between the blade assembly as a whole and the blending jar. The method may also include sealing the bottom opening. The relative movement may be induced by the blade impacting media held in the blending jar.

The above summary of the present invention is not intended to describe each embodiment or every implementation of the present invention. The Figures and the detailed description that follow more particularly exemplify a variety of preferred embodiments.

BRIEF DESCRIPTION OF THE DRAWINGS

The accompanying drawings and figures illustrate a number of exemplary embodiments and are part of the specification. Together with the present description, these drawings demonstrate and explain various principles of this disclosure. A further understanding of the nature and advantages of the present invention may be realized by reference to the following drawings. In the appended figures, similar components or features may have the same reference label.

Figure 1:
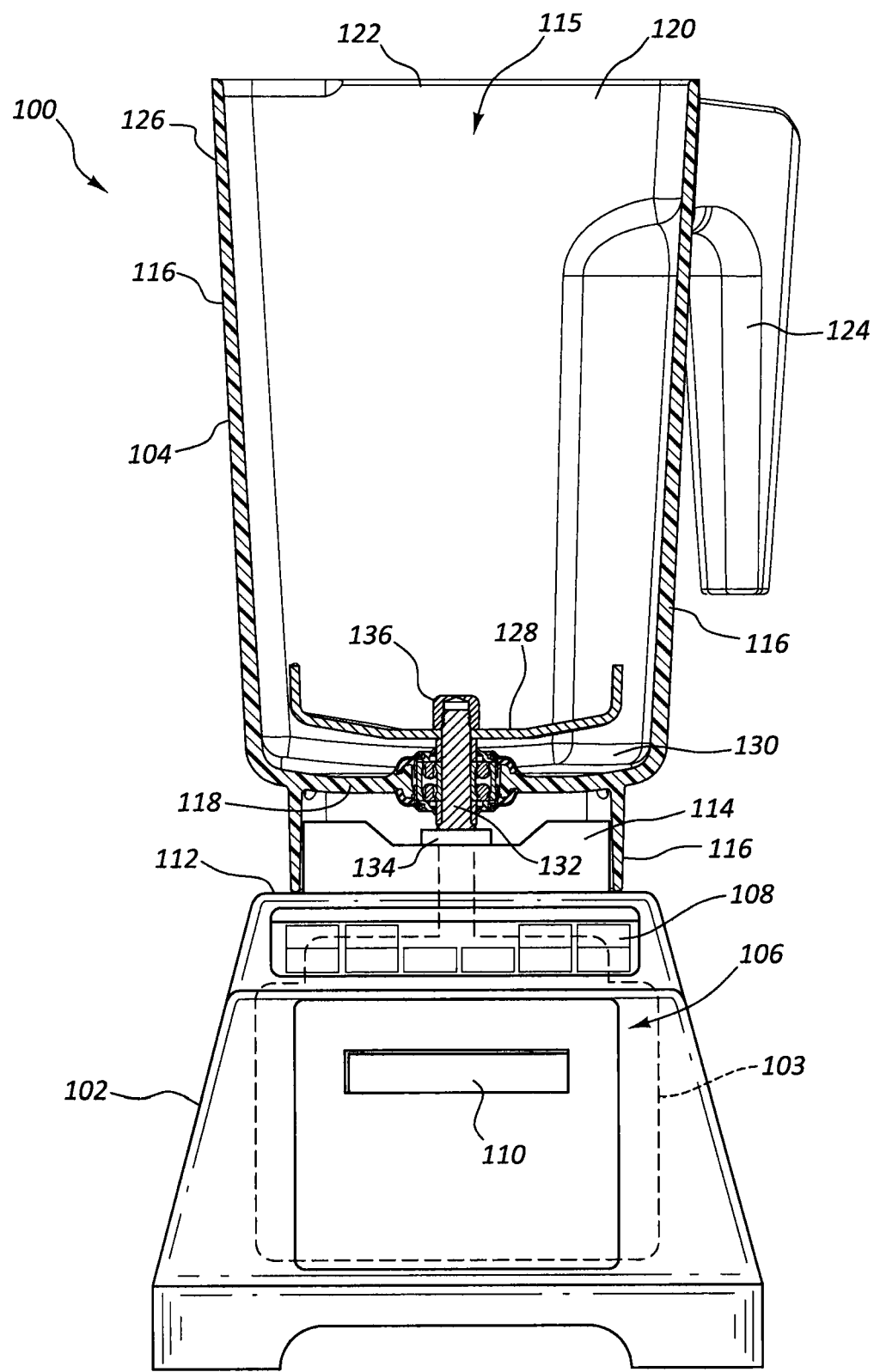
FIG. 1 is a side view of a blender apparatus according to an embodiment of the present disclosure with the blending jar and blade assembly being shown in cross-section.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The present disclosure generally relates to a blender configured to dampen impact forces between a blending blade and a blending jar, thereby minimizing and dissipating the transmission of vibrations and jolts to the jar. A blender may include a blender base, a blending jar mounted to the base, and a blending blade assembly positioned in a seal opening in the blending jar. The blending blade assembly may comprise a blending blade, a jar shaft attached to the blade and extending through the seal opening, a circular motion guide positioned around the jar shaft, and at least one jar seal positioned between the circular motion guide and the seal opening. The jar seal may prevent contact between the circular motion guide and the seal opening and may dampen forced induced by relative motion between the seal opening and the blending blade, jar shaft, and/or circular motion guide. A motor may be in the blender base and may drive the blade via the jar shaft.

In some embodiments, the jar seal may have a plurality of protrusions or ridges that extend from its outer surface. The protrusions or ridges may help ensure a tight seal between the blending jar and the blade assembly or between the jar seal and a housing covering the jar seal.

A circular motion guide housing may be positioned between the circular motion guide and the jar seal, and the jar seal may be held in position by the housing. For example, the housing may have an annular groove in which the jar seal may be retained between the housing and the seal opening of the jar. The jar seal may also have an external groove in which the seal opening of the jar is positioned. Alternatively, the jar may comprise an annular groove around the seal opening, and the jar seal may be in the annular groove of the seal opening. In some cases, the jar may have an upper annular groove and a lower annular groove that extend around the seal opening on upper and lower surfaces of the bottom of the jar. The jar seal may be seated in the upper and lower annular grooves.

The jar seal may be configured to contact an inner surface and an outer surface of the jar at the seal opening. In some arrangements, the inner surface may be an inward- or upward-facing surface of the mixing container or jar that faces the blade, and the outer surface may be an outward- or downward-facing surface that faces away from the blade. In another case, the inner surface may be defined as a radially internal surface and the outer surface may be a radially external surface relative to the jar shaft. Thus, the inner surface of the jar at the seal opening may face radially inward and the outer surface may face radially outward. The jar seal may wrap around portions of the jar to contact the inner and outer surfaces of the jar at the seal opening, or multiple component parts of the jar seal may contact each surface individually or separately. In this manner, the surface area in contact between the seal and the bottom wall of the jar and seal opening may be increased to improve sealing. This may also increase the number of directions in which the blade assembly may be dampened relative to the jar.

Another aspect of the disclosure relates to a blending blade assembly for use in a blending apparatus or food processor. The blade assembly may comprise a drive shaft, a blending blade attached to an end of the drive shaft and configured to rotated with it, a circular motion guide positioned around the drive shaft, and a flexible seal comprising a dampening material and configured to contact a blending jar. A housing may be positioned between the circular motion guide and the seal, such as a circular motion guide housing. The housing may also be positioned around or extend around an external surface of the flexible seal. The dampening material may comprise any material with compliant properties, such that it can dampen the impact energy by elastically deforming the dampening material. Common materials for the application would be silicones, TPUs, TPEs, natural rubbers, and other mid-durometer plastics.

Another aspect of the disclosure is directed to a method of dampening impact forces between a blending blade assembly and a blending jar, including providing a blending jar with a bottom opening, positioning a blade assembly in the bottom opening, and dampening relative movement between the blade assembly as a whole and the blending jar.

The teachings of the present disclosure may be applied to increase the lifespan and durability of a blade assembly and associated blending jar by dampening their relative movements when a blade impacts hard materials at high speeds. Thus, damage to the blade assembly or jar may be isolated from the other, and damaged components can be replaced without the entire jar and blade assembly needing replacement. Also, potentially damaging forces applied to one of the blade assembly or jar may be less likely to be transferred into the other.

The present description provides examples, and is not limiting of the scope, applicability, or configuration set forth in the claims. Thus, it will be understood that changes may be made in the function and arrangement of elements discussed without departing from the spirit and scope of the disclosure, and various embodiments may omit, substitute, or add other procedures or components as appropriate. For instance, the methods described may be performed in an order different from that described, and various steps may be added, omitted, or combined. Also, features described with respect to certain embodiments may be combined in other embodiments.

The figures show representative embodiments of a blending device that may implement some of the features and processes described herein. FIG. 1 shows a side view of a blender 100 having a base 102 and a mixing container, which may be referred to herein as a jar 104. The jar 104 is shown in section view to reveal the details of its contents, but the base 102 is not.

The base 102 may be referred to as a blending base or housing of the blender 100. The base 102 may comprise a user interface 106 such as a plurality of control buttons 108 and a display 110. The base 102 may be configured to house and contain a motor 103 connected to the blade assembly of the jar 104. The base 102 may also be configured to be positioned on a flat horizontal surface to support the motor and jar 104 during blending. While in this embodiment the base 102 is shown as a blender base, in other embodiments, the base 102 may comprise additional features, such as a connection to a mixing bowl or other attachments, such as those used in a food processor or food mixer. It will be understood that base 102 is shown as a representative example of one of many different possible kinds of bases of blenders or other motorized food processing devices.

The jar 104 may be mounted to a top surface 112 of the base 102. The base 102 may have a base flange 114 configured to be inserted at least partially into a jar flange 116 of the jar 104 to ensure proper orientation and secure fit between the jar 104 and the base 102. In another embodiment, a jar flange 116 may be positioned within a base flange 114.

Figure 2:
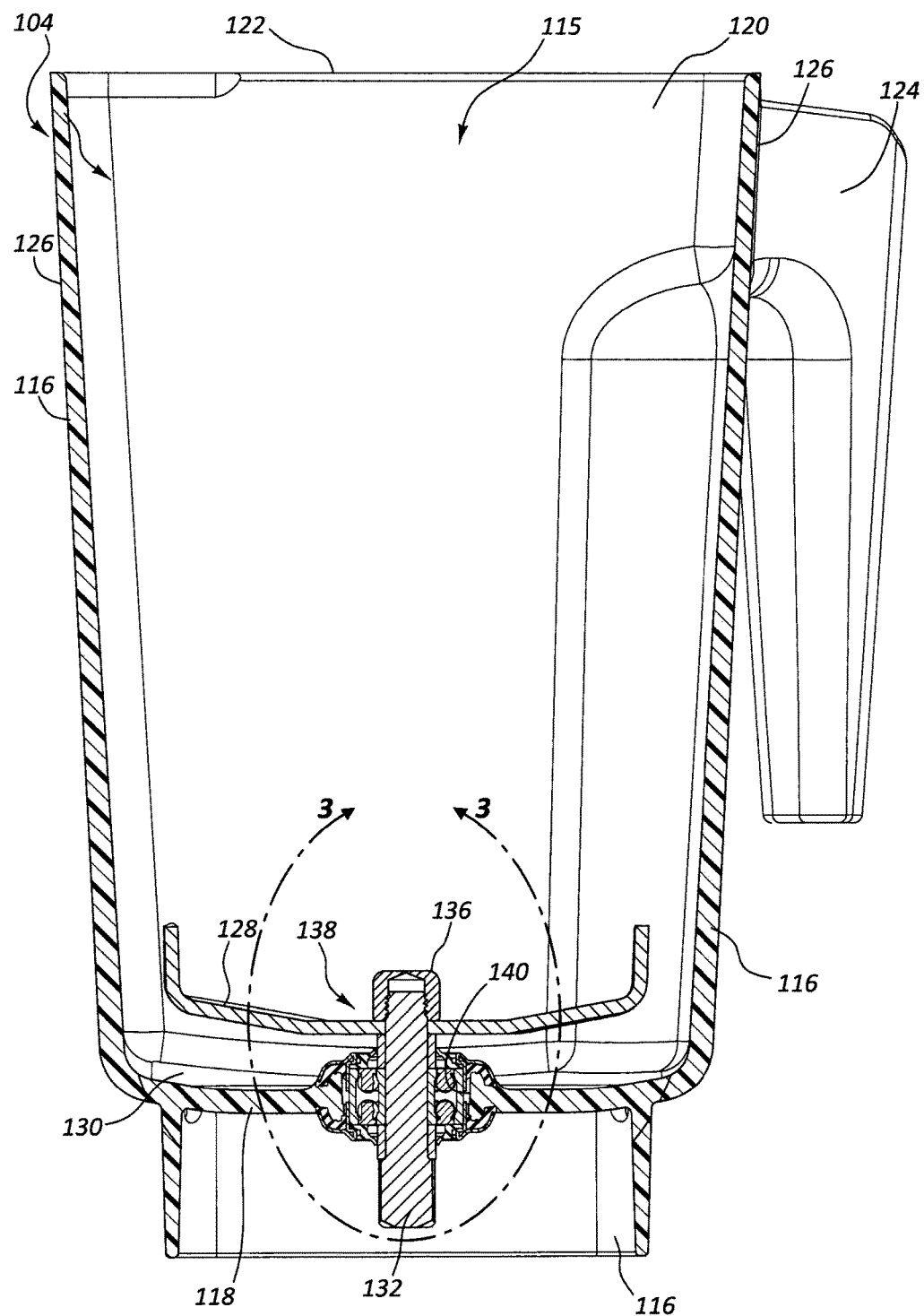
FIG. 2 is a side section view of a blending jar and blade assembly.
Figure 3:
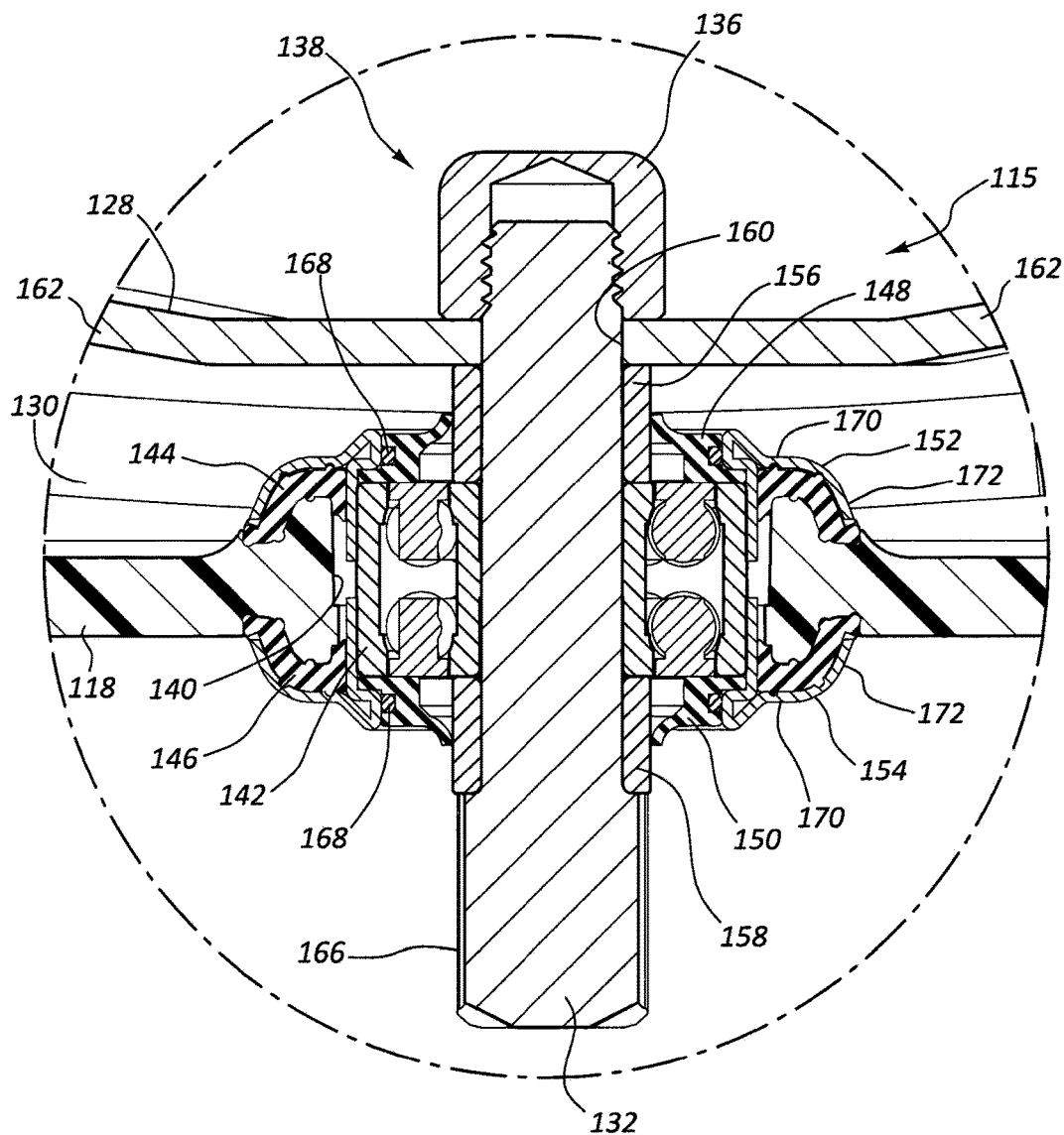
FIG. 3 is a detail section view of the blade assembly of FIG. 2.

Additional features of the jar 104 may be viewed with reference to FIGS. 1-3. The jar 104 may comprise a mixing container 115 bounded by one or more sidewalls 116 and a bottom wall 118. An upper end 120 of the jar 104 may have an upper opening 122 configured as the opening through which ingredients are added or poured from the mixing container 115 of the jar 104. In some embodiments, a lid (not shown) may be mounted or attached to the upper end 120 to seal the upper opening 122 or to limit the expulsion of material from the mixing container 115. A handle 124 may extend from an external surface 126 of the jar 104 to provide a grip for holding and moving the jar 104.

A blade 128 may be positioned at a lower end 130 of the jar 104. The blade 128 may be configured to rotate generally horizontally in the lower end 130 of the jar 104 due to rotation of a jar shaft 132 (i.e., drive shaft) that is configured to connect to a motor shaft 134 (see FIG. 1) driven by the motor 103 in the base 102. In some embodiments, the blade 128 may be removable from the jar shaft 132, such as, for example, by removing an end nut 136 that secures the blade 128 to the jar shaft 132. Thus, the blade 128 may be replaceable or removable.

Figure 4:
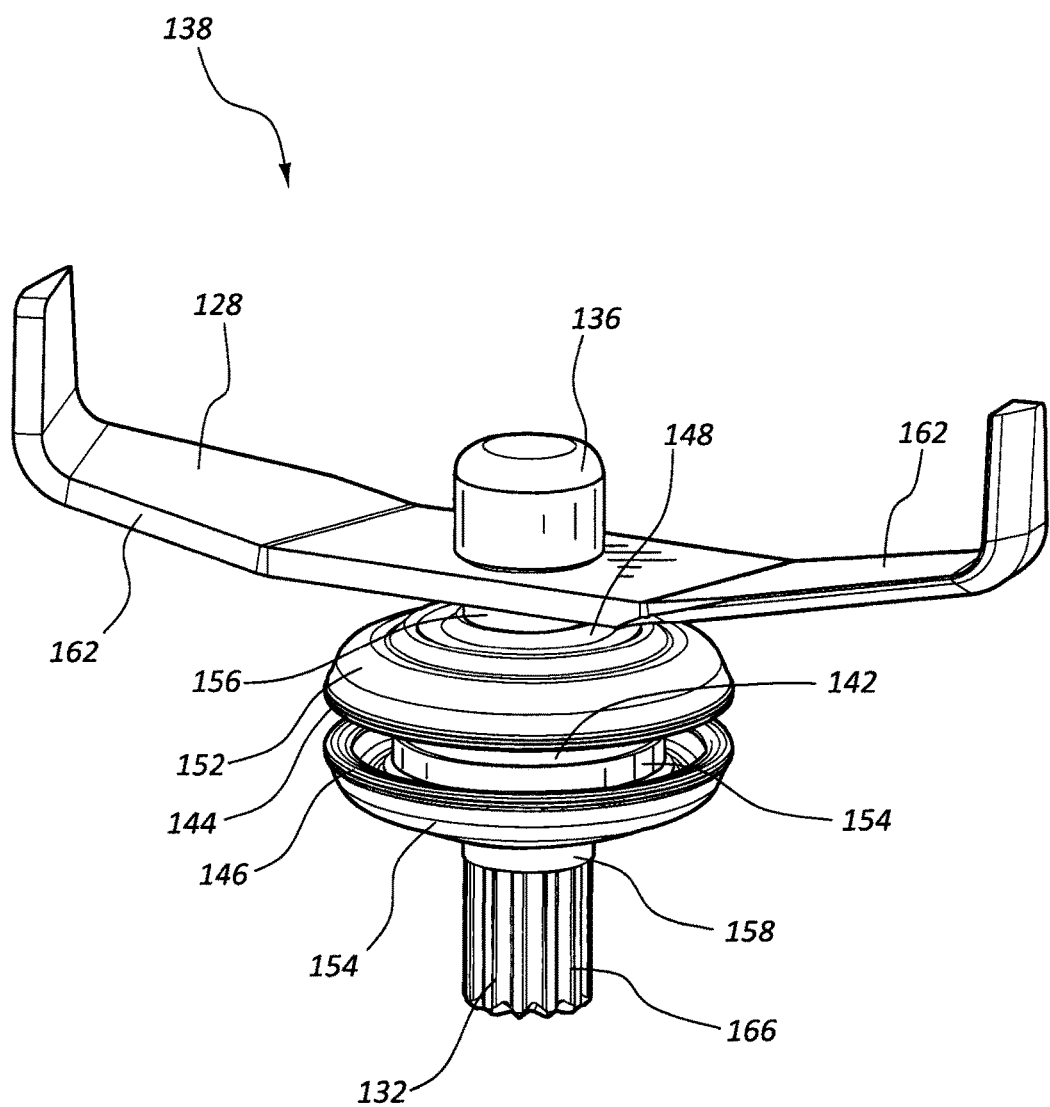
FIG. 4 is a perspective view of the blade assembly of FIG. 2.
Figure 5:
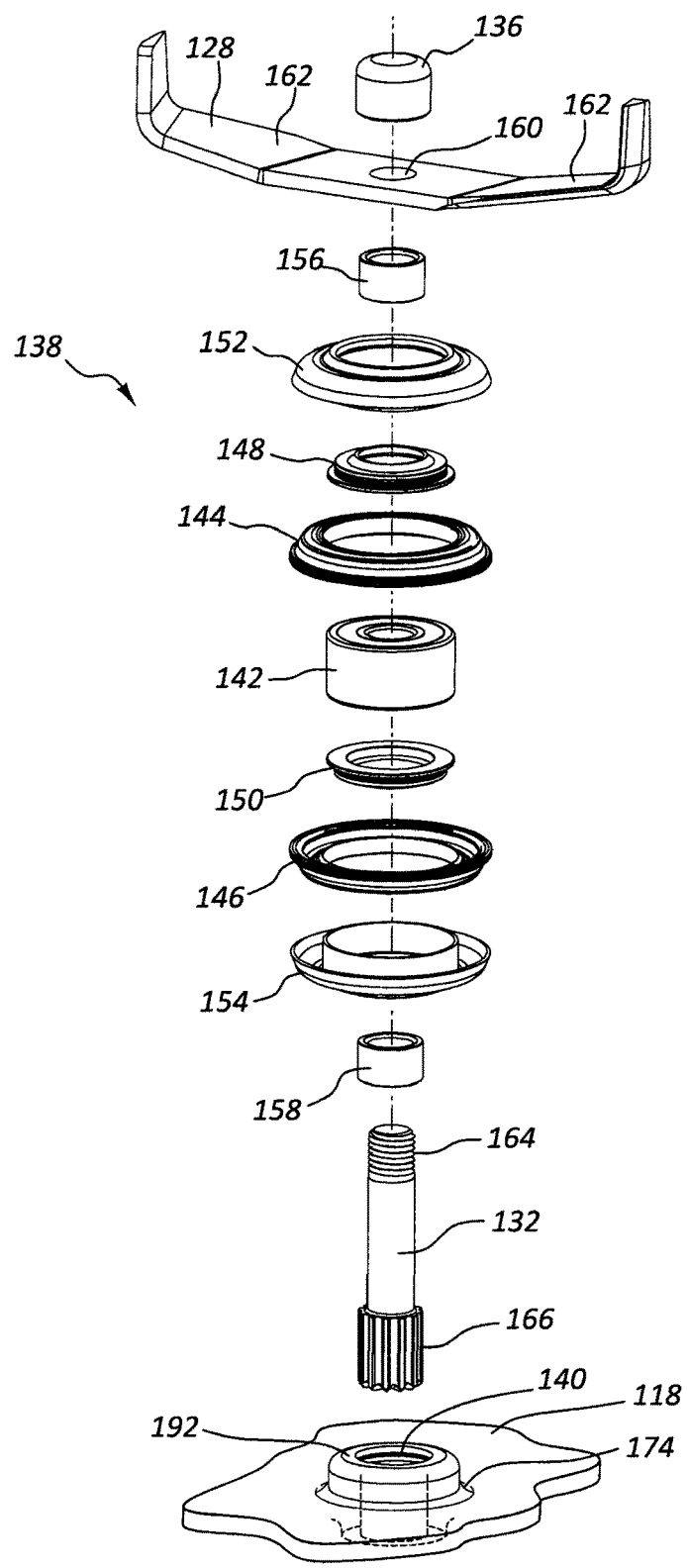
FIGS. 5-6 are upper and lower perspective exploded views, respectively, of the blade assembly and bottom wall of the jar of FIG. 2.
Figure 6:
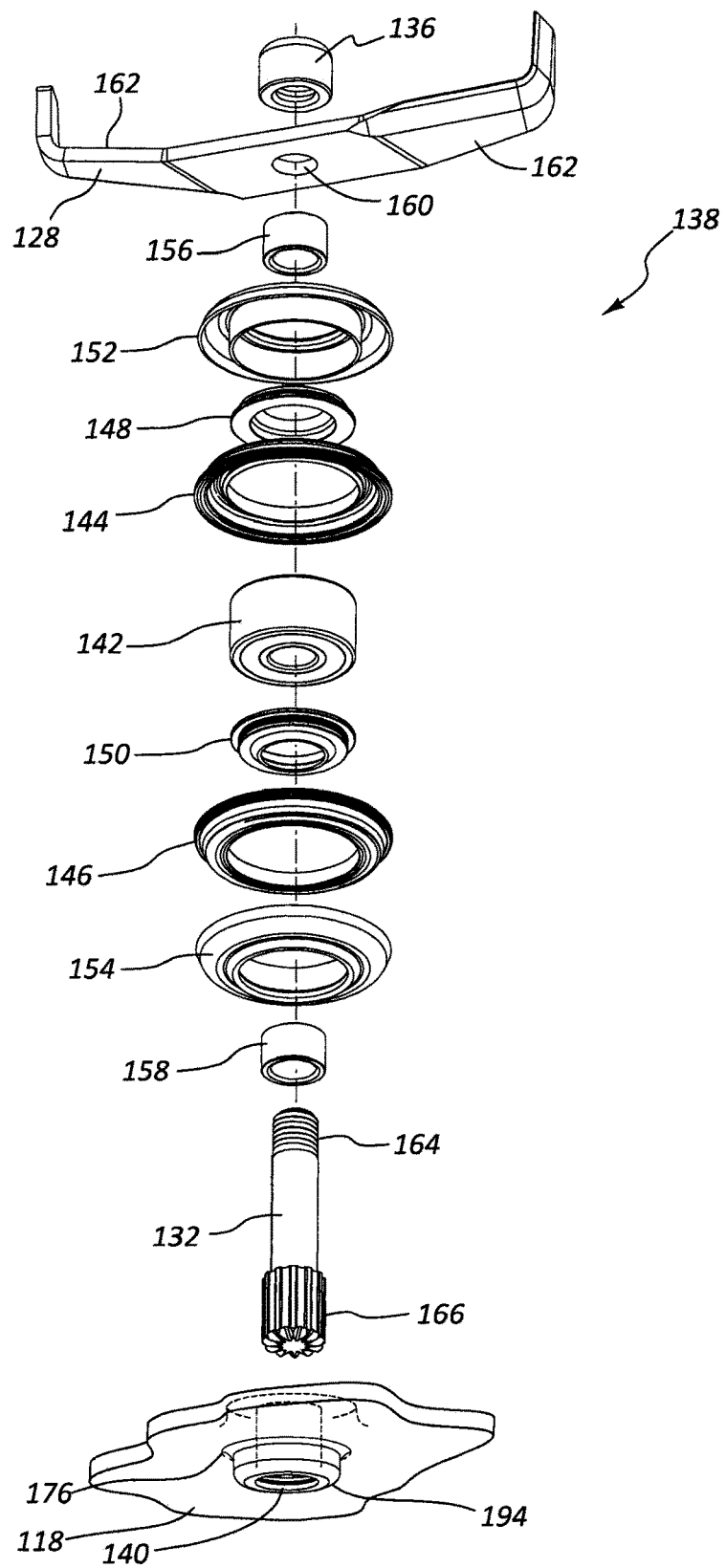

The blade 128 and jar shaft 132 may be parts of a blade assembly 138 positioned in a seal opening 140 at the lower end 130 of the jar 104. The blade assembly 138 is shown in detail in FIGS. 3-6. FIG. 3 is a detailed section view of the blade assembly 138 in the seal opening 140, FIG. 4 is a perspective view of the blade assembly 138 isolated from the jar 104, and FIGS. 5 and 6 are exploded views of the blade assembly 138 and the bottom wall 118 of the jar 104 where the seal opening 140 is positioned. The blade assembly 138 may comprise the blade 128, end nut 136, jar shaft 132, a bearing 142, a first jar seal 144, a second jar seal 146, an upper shaft seal 148, a lower shaft seal 150, an upper housing 152, a lower housing 154, an upper spacer 156, and a lower spacer 158.

The blade 128 may have a central opening 160 configured to receive the drive shaft 132 as shown in FIGS. 3, 5, and 6. The blade 128 may be constructed with two or more wings 162 that extend peripherally from the central opening 160. The wings 162 may have a shape configured to cut, shear, and/or pulverize ingredients in the mixing container 115 of the jar 104.

As shown in FIGS. 5-6, the jar shaft 132 may comprise a threaded portion 164 configured to engage threads of the end nut 136. The jar shaft 132 may also have a gear portion 166 configured to engage a mating gear surface of the motor shaft 134. See also FIG. 8. The length of the jar shaft 132 may be based on the length required for the jar shaft 132 to extend through the seal opening 140 while having the bearing 142, the spacers 156, 158, blade 128, and end nut 136 all properly positioned around it, as shown in FIG. 3, while still having a gear portion 166 that is sufficiently large to ensure secure engagement with the motor shaft 134.

The bearing 142 is a circular motion guide that may be a sealed bearing configured to provide smooth rotation for the jar shaft 132 relative to the jar 104 or relative to the jar seals 144, 146. Other types of circular motion guides may be used as well, such as, for example, bushings or braces. As shown in FIG. 3, the spacers 156, 158 may contact the bearing 142 to provide even further engagement with the inside of the bearing 142. The upper and lower shaft seals 148, 150 may be positioned at upper and lower positions relative to the bearing 142, respectively, to keep the bearing 142 clean and to resist or prevent penetration of liquids or other materials into or out of the seal opening 140 through the bearing 142 and along the jar shaft 132. In some embodiments, the upper and lower shaft seals 148, 150 may comprise a resilient material that allows them to resiliently bias against the spacers 156, 158 for a tight seal when they are properly positioned. The upper and lower shaft seals 148, 150 may also have respective o-rings 168 to further improve their sealing ability against the upper and lower housings 153, 154. See FIG. 3.

The upper and lower housings 152, 154 may engage the upper and lower shaft seals 148, 150 and the bearing 142. The upper and lower housings 152, 154 may comprise a rigid material, such as a metal or hard plastic material to withstand impacts of media flowing in the jar 104 and to shield the blade assembly 138 from damage, particularly at the upper and lower shaft seals 148, 150 and at the first and second jar seals 144, 146 since these seals 144, 146, 148, 150 may typically comprise a resilient material that is less durable than the housings 152, 154.

As shown in FIGS. 3-6, the upper and lower housings 152, 154 may comprise a partially curved shape. Thus, the housings 152, 154 may be referred to as being positioned between the bearing 142 and the first and second jar seals 144, 146 (e.g., with intermediate portions 169 of the upper and lower housings 152, 154 (see FIG. 3A)). In this manner, the housings 152, 154 may be referred to as a bearing housing. In other embodiments, the bearing 142 may comprise its own separate housing, such as, for example, one in which ball bearings are retained. The upper and lower housings 152, 154 may also be positioned exterior to the first and second jar seals 144, 146. The exterior portions of the first and second jar seals 144, 146 may be protected by the housings 152, 154 in a vertical direction (e.g., by vertically-facing portions 170 of the housings 152, 154), a horizontal direction (e.g., by laterally-facing portions 172 of the housings 152, 154), or a combination thereof. See FIGS. 3-3A.

In some embodiments, the housings 152, 154 may completely cover the external surfaces of the first and second jar seals 144, 146 that would be exposed when the jar seals 144, 146 are in position around the seal opening 140. In other cases, the housings 152, 154 may partially cover the external surfaces of the first and second jar seals 144, 146, as shown in FIGS. 3-4, where edges of the jar seals 144, 146 are peripherally exposed adjacent to the bottom wall 118. The housings 152, 154 may be configured to resist deformation of the resilient material of the jar seals 144, 146 and to align the jar seals 144, 146 back to a predetermined size and orientation after resilient deformation of the jar seals 144, 146. Thus, the housings 152, 154 may protect and align the jar seals 144, 146 while the jar seals 144, 146 are in contact with the bottom wall 118 and seal opening 140. The housings 152, 154 may also retain the jar seals 144, 146 by holding the jar seals 144, 146 against and into seal grooves 174, 176 in the bottom wall 118. See FIG. 3B; see also FIG. 3.

The housings 152, 154 are made in two pieces in the embodiment of FIGS. 3-6. This configuration may allow relative movement between the upper and lower housings 152, 154 so that movement of the blade assembly 138 relative to the jar 104 may be more readily absorbed and dissipated by the jar seals 144, 146. Separate housing pieces may also allow the blade assembly 138 to be assembled more easily, since the rigid structure of the housings 152, 154 may be individually moved into place from above and below the seal opening 140 rather than having to be inserted or formed through the seal opening 140.

Figure 3A:
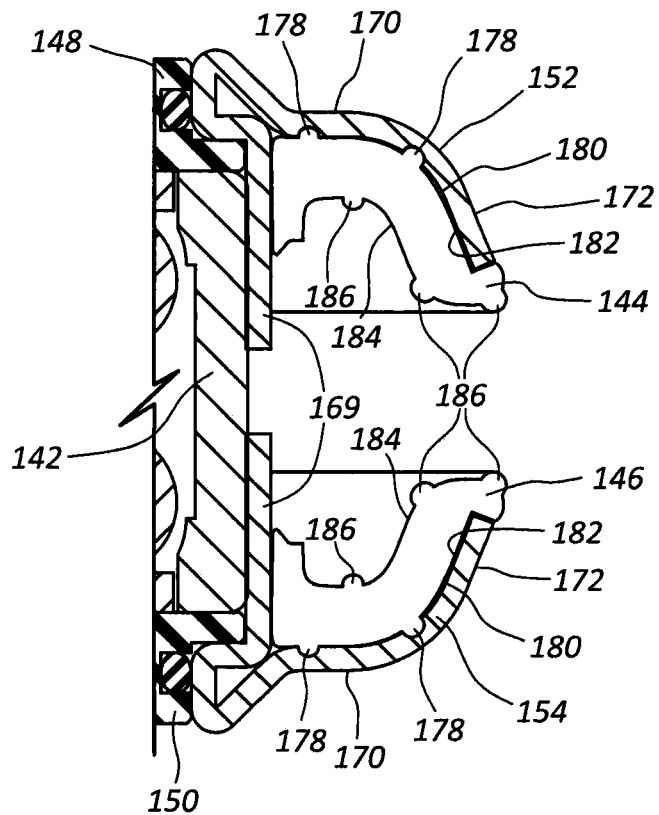
FIG. 3A is a section view of one side of the blade assembly of FIG. 2.

FIG. 3A also shows that the housings 152, 154 may be configured to contact external ridges 178 of the jar seals 144, 146. The external ridges 178 may protrude from external surfaces 180 of the jar seals 144, 146. These ridges 178 may also be deformable against the internal surfaces 182 of the upper and lower housings 152, 154 to ensure a tight seal against intrusion of fluids or other materials between the housings 152, 154 and the jar seals 144, 146. Internal surfaces 184 of the jar seals 144, 146 may have internal ridges 186 as well that can improve sealing against the bottom wall 118 when the jar seals 144, 146 are in position around the seal opening 140. For example, the internal surfaces 184 of the jar seals 144, 146 may contact the seal grooves 174, 176 in the bottom wall 118 and other external walls 188, 190 proximate the seal opening 140. See FIG. 3B. In some embodiments, ridges 178 and/or 186 may be excluded.

Figure 3B:
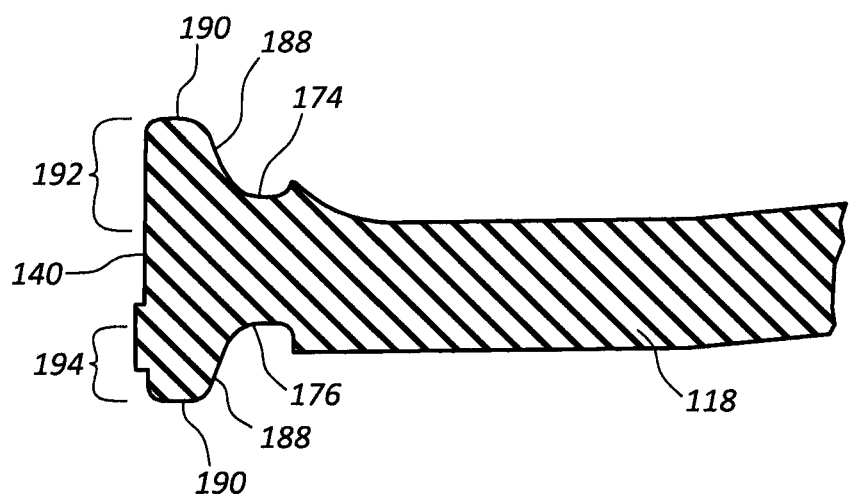
FIG. 3B is a section view of one side of the seal opening of the jar of FIG. 2.

FIG. 3B shows one side of the bottom wall 118 of the jar 104 at the seal opening 140 in cross-section. The seal opening 140 and external walls 188, 190 may collectively form an upper post 192 extending upward from the upper seal groove 174 of the bottom wall 118 into the mixing container 115 and a lower post 194 extending downward from the lower seal groove 176 of the bottom wall 118. See also FIGS. 5-6. Overall, the upper and lower posts 192, 194 and bottom wall 118 may form a sideways "T"-shaped cross-section, as seen in FIG. 3B. This "T"-shaped cross section may be configured to be received by an interlocking "C"-shaped cross-section of the jar seals 144, 146 and housings 152, 154 of the blade assembly 138, as shown in FIG. 3. The jar seals 144, 146 may be configured to simultaneously contact an inner surface of the seal opening (e.g., the radially inward-facing surface of the seal opening 140) and an outer surface of the seal opening (e.g., a radially outward-facing external wall 188).

The upper post 192 may improve the sealing ability of the blade assembly 138 by requiring fluids that happen to penetrate the seal groove 174 to have to also move upward along the external walls 188, 190 (where additional sealing from internal surface 184 and ridges 186 is provided) before getting through the upper jar seal 144 to the bearing 142 or to the lower jar seal 146. In conjunction with the laterally-facing surfaces 172 of the upper housing 152, the upper post 192 also helps to provide a slope to guide material and fluids in the mixing container 115 away from the blade assembly 138 and the seal opening 140 area in general. The lower post 194 may perform these functions when the jar 104 is upside down.

In at least one embodiment, the upper and lower posts 192, 194 may be collectively referred to as a post that extends through the bottom wall 118. This collective post may comprise a top surface (e.g., surface 190 of upper post 192) and a bottom surface (e.g., surface 190 of lower post 194). The jar seals 144, 146 may cover these top and bottom surfaces 190. In some embodiments, a single jar seal extends around and covers the top and bottom surfaces 190. See, e.g., FIGS. 9I-9K.

Another benefit of the sideways "T" cross-sectional shape formed by the posts 192, 194 and the bottom wall 118 is that the jar seals 144, 146 may extend around and dampen movement of the blade assembly 138 relative to the bottom wall 118 in every direction, namely laterally left and right, vertically up and down, and rotationally (i.e., with the blade assembly 138 tilting toward the sidewalls 116 of the jar 104). In each direction or mode of motion, at least one portion of the jar seal 144, 146 remains between the blade assembly 138 and the bottom wall 118 or posts 192, 194 so that there is no mode without dampening.

Figure 7:
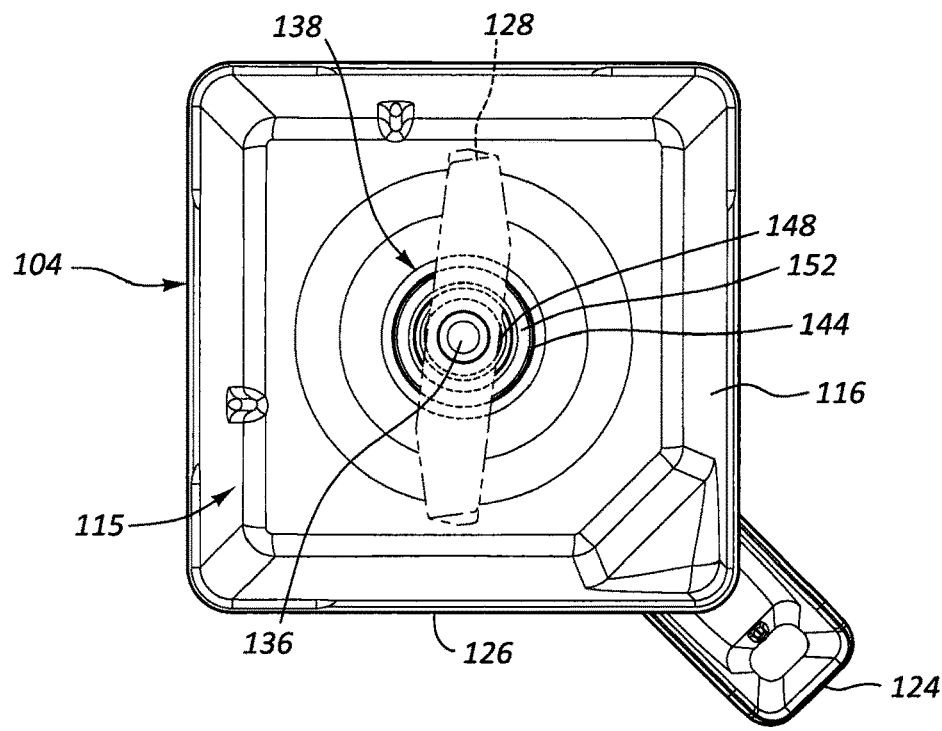
FIG. 7 is a top view of the jar of FIG. 2 with the blade shown in phantom lines.
Figure 8:
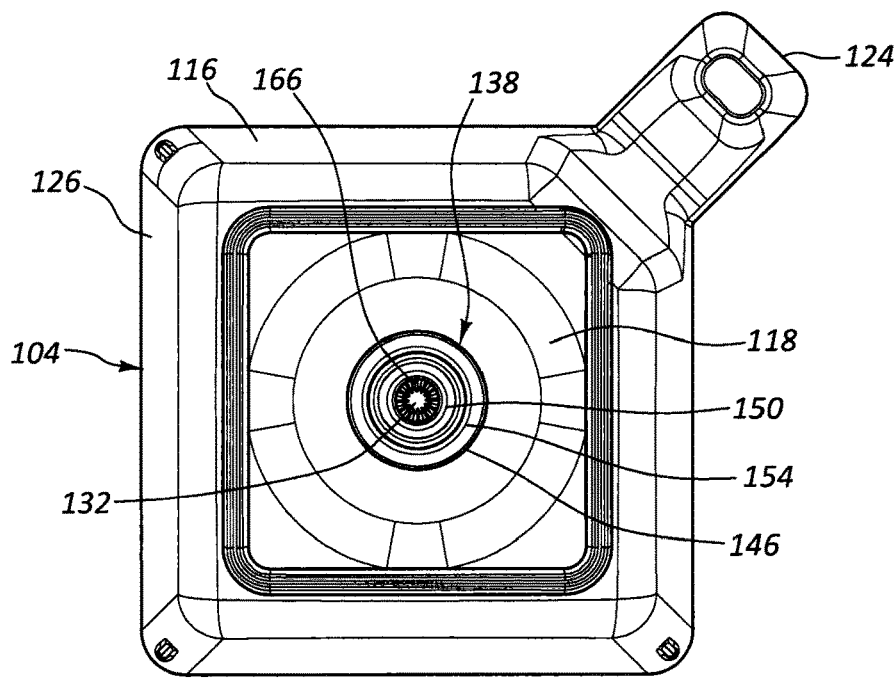
FIG. 8 is a bottom view of the jar of FIG. 2.

FIG. 7 shows a top view of the jar 104 with the blade assembly 138 wherein the blade 128 is shown in phantom lines to reveal the other elements of the blade assembly 138 beneath. FIG. 8 is a bottom view of the jar 104 with the blade assembly 138. The seal opening 140 in which the blade assembly 138 is positioned is circular in this embodiment, so the blade assembly 138 is also circular. In other embodiments the seal opening 140 may be non-circular, and the blade assembly 138 may therefore be configured with a correspondingly fitting non-circular shape.

FIGS. 9A-9L show various alternative embodiments of blade assemblies (200-A through 200-L) of the present disclosure. Each blade assembly 200-A through 200-L is shown with a blade 228, jar shaft 232, and end nut 236. Upper shaft seals 248-A through 248-L and lower shaft seals 250-A through 250-L seal the jar shafts 232 and/or bearings 242-A through 242-L in each embodiment. Each alternative embodiment has a seal opening 240 in the bottom wall 218-A through 218-L through which the jar shaft 232 extends.

Figure 9A:
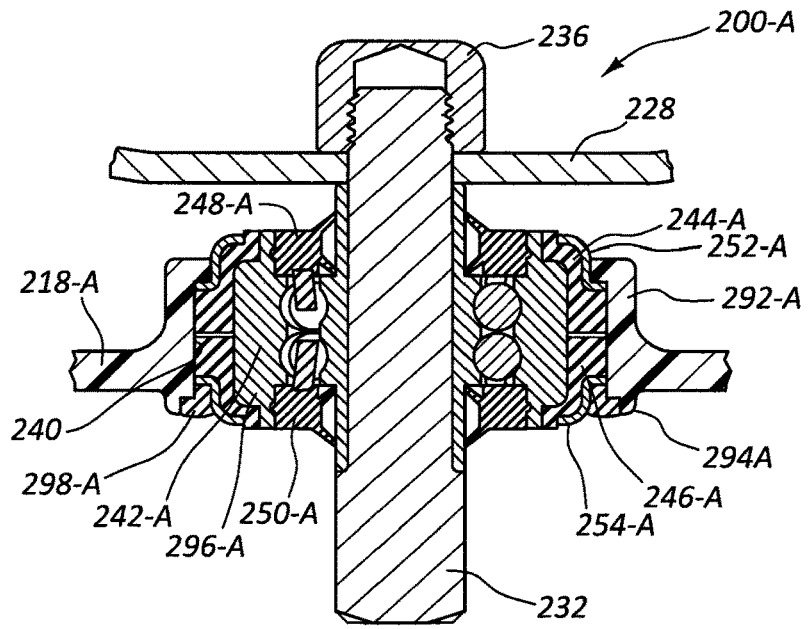
FIGS. 9A-9L show different alternative embodiments of blade assemblies and seal openings of blending jars.
Figure 9B:
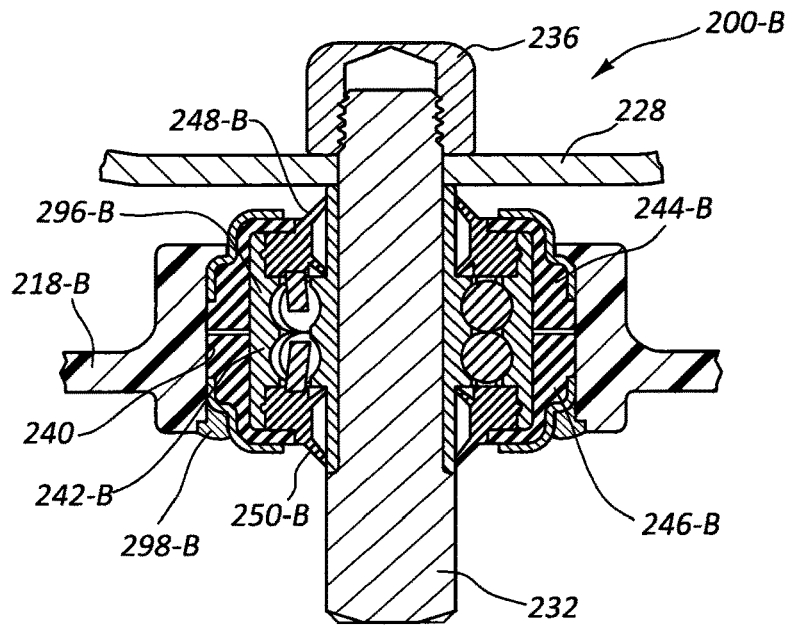

In FIG. 9A, relative motion between the blade assembly 200-A and the bottom wall 218-A is dampened by an upper jar seal 244-A and a lower jar seal 246-A positioned between the bottom wall 218-A and the bearing 242-A. In this embodiment, the jar seals 244-A, 246-A are attached to an external housing 296-A of the bearing 242-A and upper and lower housings 252-A, 254-A that are external to the jar seals 244-A, 246-A. The jar seals 244-A, 246-A may therefore be configured to be bonded to or compressed around the external housing 296-A to keep the jar seals 244-A, 246-A in place. The external housing 296-A may be referred to as extending into an internal annular groove formed between the jar seals 244-A, 246-A. The thickness and size of the external housing 296-A may also reduce the volume of resilient material between the bottom wall 218-A and the bearing 242-A, thereby potentially increasing the rigidity of the blade assembly 200-A relative to the jar. See also FIGS. 9E-9H and 9L, where the respective bearings 242 in each embodiment extend into internal annular grooves of the respective jar seals 244.

The upper and lower housings 252-A, 254-A in this embodiment contact the seal opening 240 as well. By positioning the upper and lower housings 252-A, 254-A between the jar seals 244-A, 246-A and the bottom wall 218-A, relative motion between the blade assembly 200-A and the bottom wall 218-A may cause less wear on the surfaces of the jar seals 244-A, 246-A that are protected by the upper and lower housings 252-A, 254-A. The jar seals 244-A, 246-A may still, however, contact the seal opening 240 between the housings 252-A, 254-A to provide a seal against penetration of fluids or other materials through the seal opening 240.

The embodiment of FIG. 9A also has an upper post 292-A that is larger than its lower post 294-A. This may help separate the blade 228 and upper shaft seal 248-A from the bottom wall 218-A. The seal opening 240 may also be narrower at the top of the opening as compared to the bottom of the opening to further restrict passage of material and fluids through the opening. In some embodiments, the bottom of the seal opening 240 may be further sealed by a secondary seal (e.g., secondary seals 298-A through 298-H and 298-L). The secondary seals may help keep the blade assemblies 200-A through 200-H retained in their respective seal openings 240 when the blade assemblies are subjected to downward-directed forces and may provide a further layer of sealing protection against penetration of fluids and other materials through the seal openings 240. The secondary seals may comprise resilient and/or rigid materials. Resilient materials may increase the damping abilities of the blade assemblies, and rigid materials may improve the structural integrity of the blade assemblies. Secondary seals may be press-fit into place or may engage the seal opening 240, jar seals, shaft seals, or bearings 242 with threads or other interlocking configurations.

In FIGS. 9B-9H, the upper and lower jar seals (244-B through 244-H, 246-B through 246-H) extend into contact with the shaft seals (248-B through 248-H, 250-B through 250-H). Thus, the upper and lower jar seals 244, 246 and upper and lower shaft seals 248, 250 may provide additional protection for the bearings (242-B through 242-H) by completely preventing it from external exposure. Also, some embodiments have jar seals 244, 246 that cover seams between the shaft seals 248, 250 and the bearings 242 to improve sealing ability.

The external housings 296 of the bearings 242 of FIGS. 9B-9D, 9F, and 9H are flattened, so a greater volume of resilient material may be positioned between the seal opening 240 and the bearing 242. This may increase the flexibility of the jar seals. Alternatively, the reduced diameter of the bearings 242 may allow the blade assemblies 200 to be positioned in smaller seal openings 240.

Figure 9C:
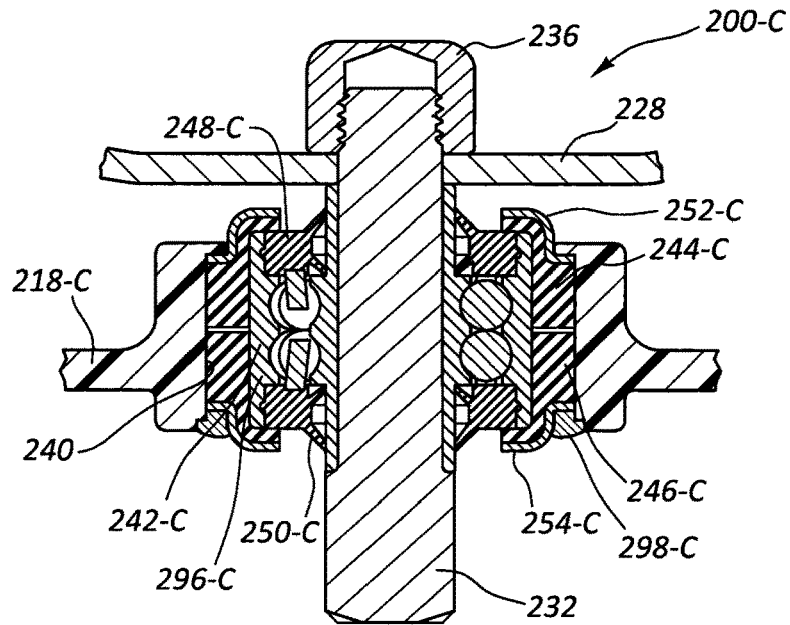
Figure 9D:
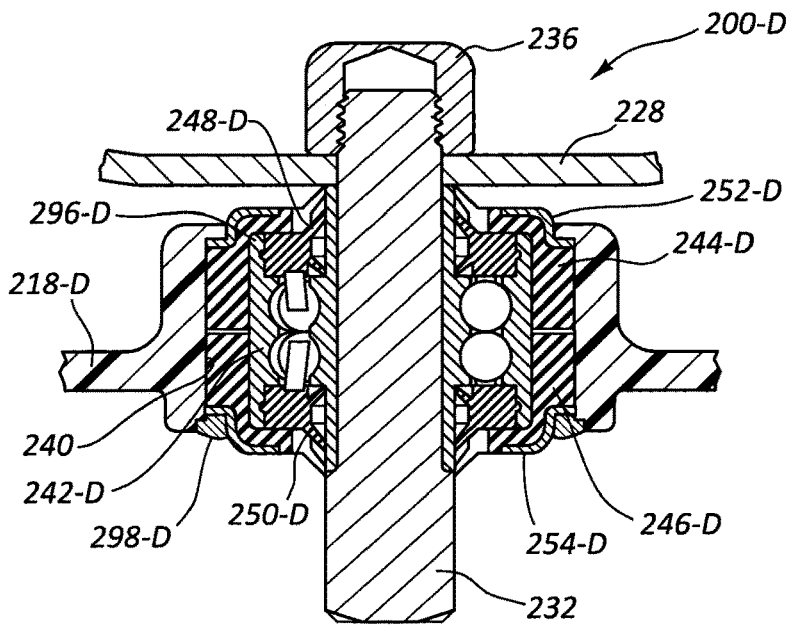

In the embodiments of FIGS. 9C-9D, the jar seals 244 extend entirely external to the shaft seals 248, 250. This may make the bearings 242 and shaft seals 248, 250 more compact.

FIGS. 9E through 9K show jar seals 244 that do not have external housings (e.g., 252, 254). Thus, the jar seals 244 are in contact with the seal openings 240 without intervening housings. However, some embodiments may have a secondary seal 298 positioned between parts of the jar seals 244 and seal openings 240.

Figure 9E:
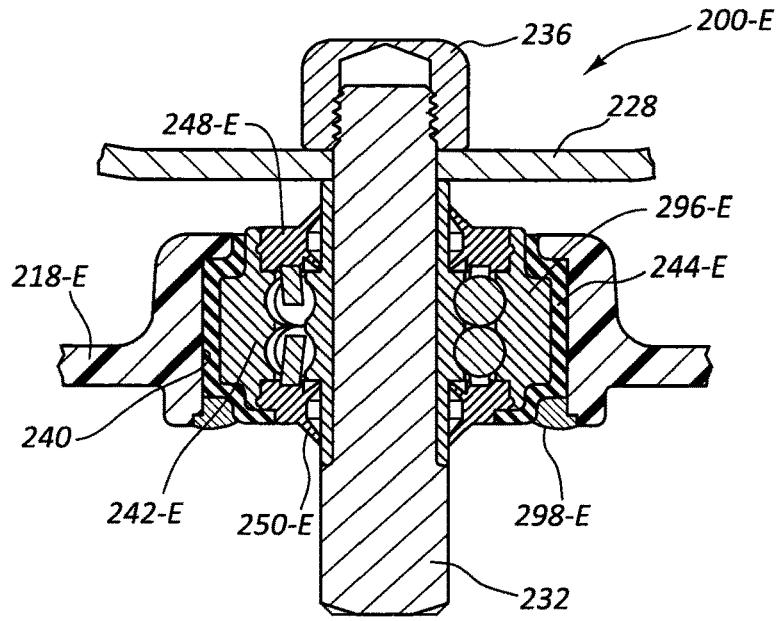

FIG. 9E shows a jar seal 244-E that is vertically asymmetrical, wherein the upper half of the jar seal 244-E has a greater inner diameter than the bottom half of the jar seal 244-E. The upper half resembles the upper half of jar seal 244-A and the lower half resembles the lower half of jar seal 244-B. This design may accommodate the implementation of the secondary seal 298-E and demonstrates that asymmetrical jar seals 244 may be used. This embodiment also demonstrates that features of each of the example embodiments shown herein may be arranged in combination where possible.

FIGS. 9E through 9L illustrate single-piece, integral jar seals 244. In some embodiments, it may be advantageous to use a single-piece jar seal 244 to reduce potential failure modes for the jar seal 244 since the seams between jar seal pieces are eliminated. Reduction of the part count may also simplify the design and reduce manufacturing costs.

Figure 9F:
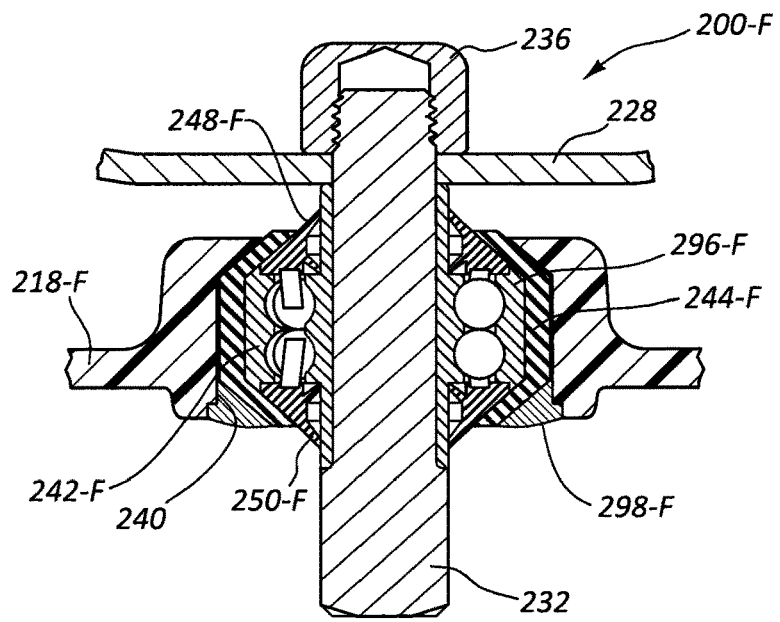
Figure 9G:
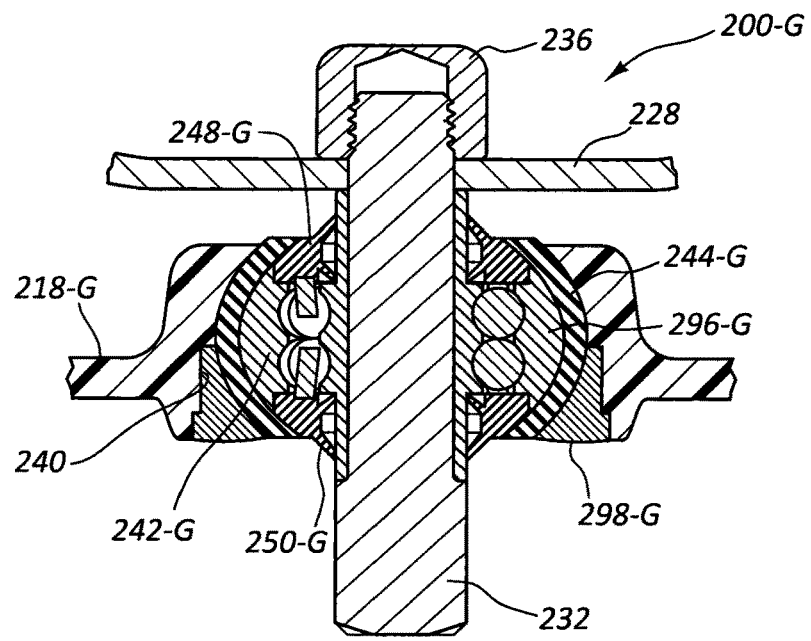
Figure 9H:
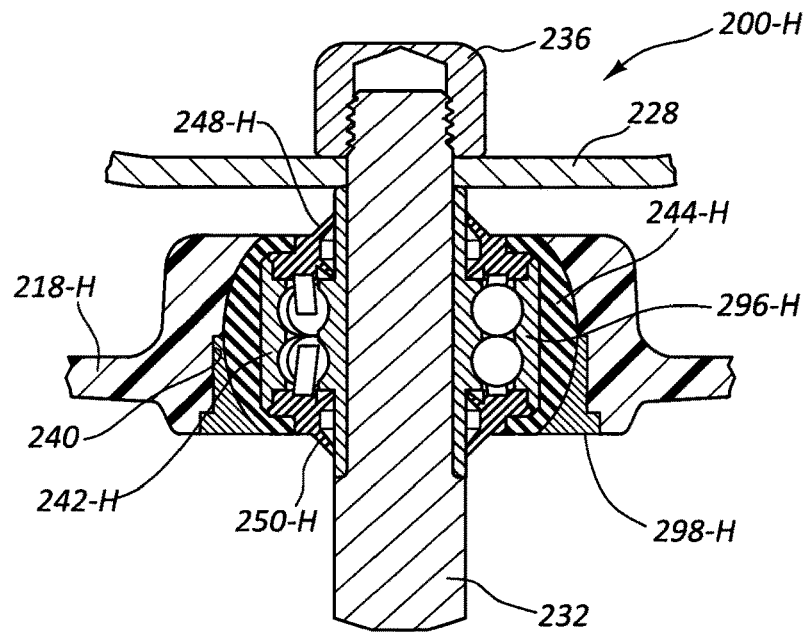

FIG. 9F shows a jar seal 244-F with angled outer and inner surfaces. In some embodiments, it may be beneficial to reduce the inner diameter of the upper and lower ends of the jar seal 244 to prevent penetration to the bearing 242 and to accommodate irregular or angled shapes of seal openings 240. Similarly, FIGS. 9G and 9H show jar seals 244-G, 244-H with curved outer surfaces to contact curved seal openings 240 and to limit the number of straight seams through the blade assemblies 200-G, 200-H that may be more vulnerable to leaks.

Figure 9I:
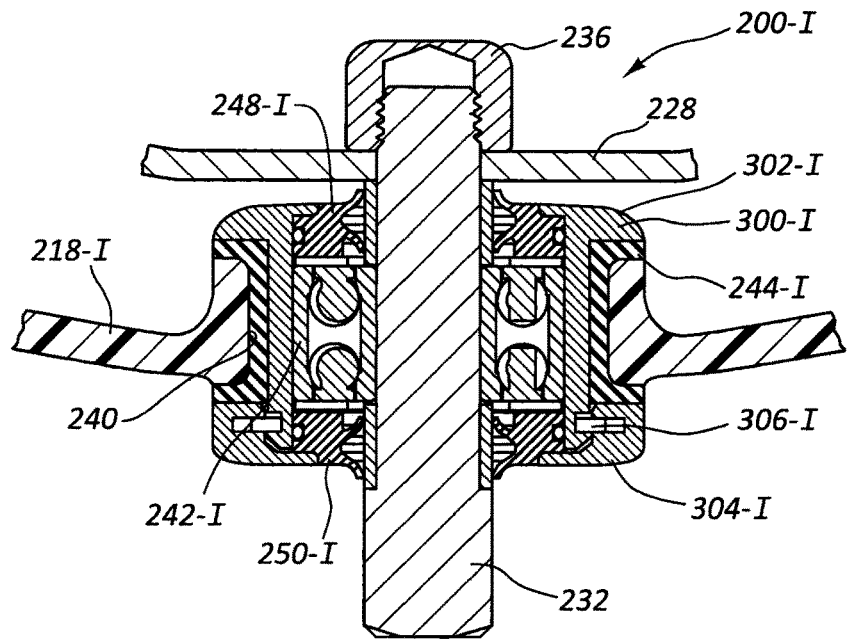
Figure 9J:
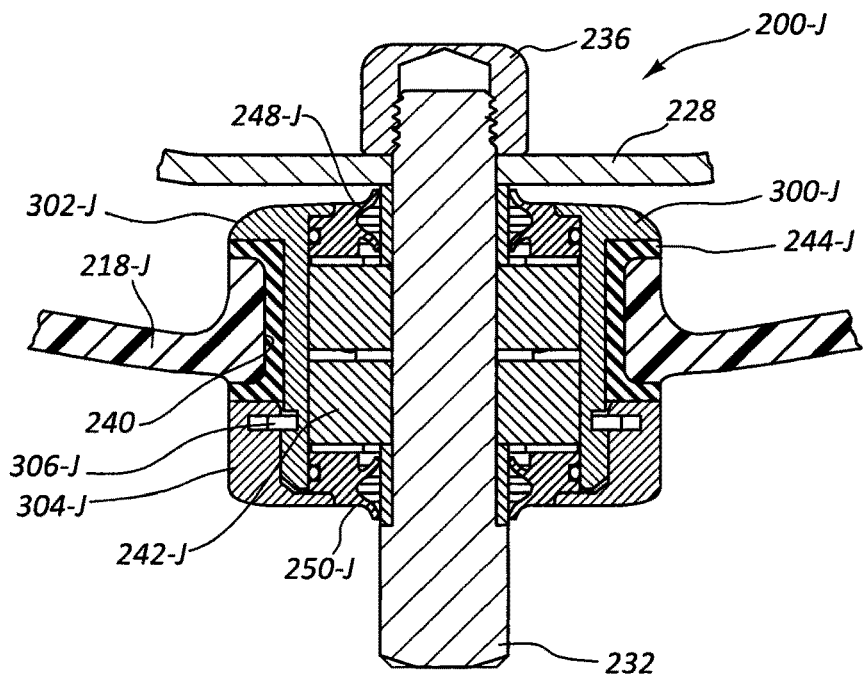

The embodiments of FIGS. 9I through 9L may further comprise secondary bearing housings 300-I through 300-L. These secondary bearing housings 300 may protect the bearings 242 and may provide outer surfaces against which the jar seals 244 may be attached or rest against. The secondary bearing housings 300-I through 300-K may also be configured to disassemble upper and lower portions 302, 304 to allow the blade assemblies 200 to be removable from the seal openings 240 for simplified cleaning, replacement, and/or maintenance. A snap ring 306 may be positioned between the upper and lower portions 302, 304 of the secondary bearing housings that promotes connection while allowing disconnection of the upper and lower portions 302, 304 upon application of a sufficient separating force. FIGS. 9I-9J in particular show how different secondary bearing housings 300-I and 300-J may be used in the same seal opening 240 to accommodate different types of bearings 242 or other blade assembly 200 components.

Figure 9K:
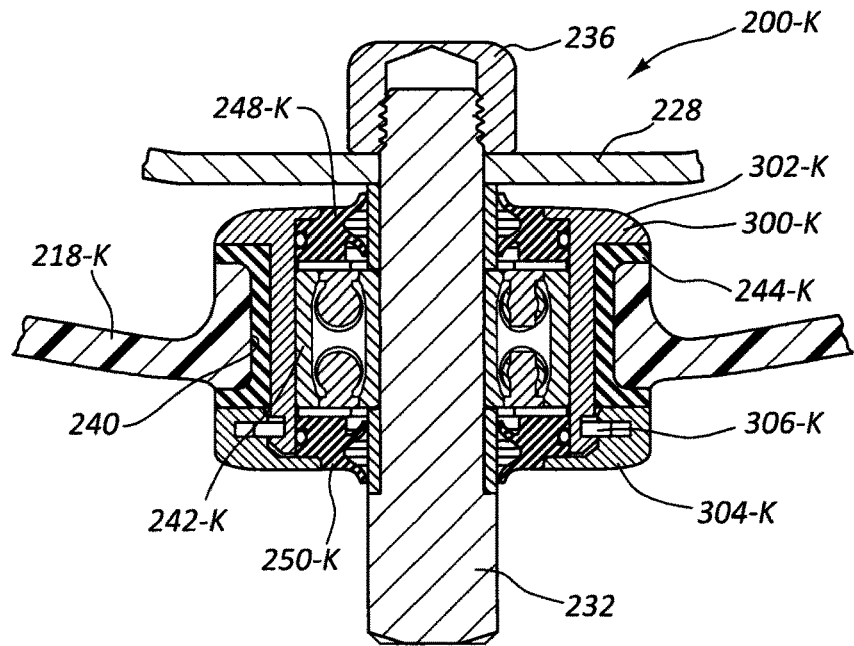
Figure 9L:
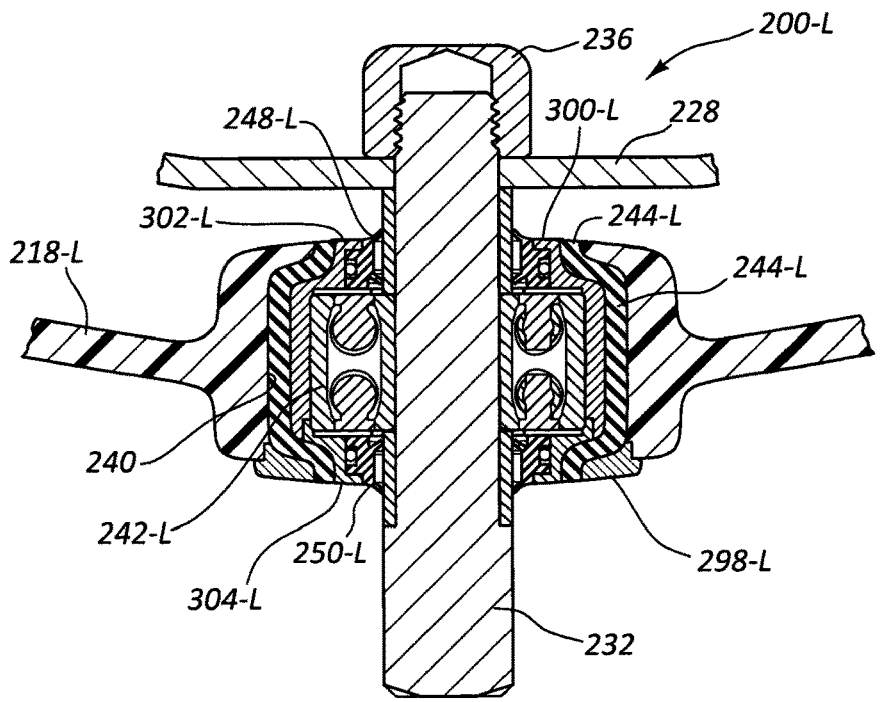

The embodiments of FIGS. 9I through 9L also demonstrate that the jar seals 244 may have a shape with an internal annular groove (as in 244-L) or an external annular groove (as in 244-I, 244-J, and 244-K). The surfaces of the seal openings 240 and secondary bearing housings 300 may mirror these grooves to have inner annular protrusions or outer annular protrusions. FIGS. 9I-9K show embodiments where the jar seals 244 comprise external annular grooves contacting seal openings 240.

An additional aspect of the present disclosure relates to a method of dampening impact forces between a blending blade assembly and a blending jar. The method may include providing a blending jar that has a bottom opening and positioning a blade assembly in the bottom opening. The bottom opening may be a seal opening and the blade assembly may be a blade assembly discussed elsewhere herein. The blade assembly may comprise a blade positioned in the blending jar, such as, for example, in the mixing container 115, a jar shaft extending through the bottom opening and attached to the blade, and a bearing or other circular motion guide positioned around the jar shaft.

The method may further include dampening relative movement between the blade assembly as a whole and the blending jar, such as, for example, by positioning a dampening member between the bottom opening and the blade assembly. The method may also include sealing the bottom opening, such as by using a dampening member to seal the bottom opening by positioning the dampening member between the blade assembly and the bottom opening. Relative movement between the blade assembly and the jar may be induced by many things, such as, for example, rotation of the blade, impacts of media in the jar against the blade assembly, or vibration of a motor engaging the jar shaft. Implementation of such methods may extend the lifespan and general durability of a blending jar and blade assembly.

Various inventions have been described herein with reference to certain specific embodiments and examples. However, they will be recognized by those skilled in the art that many variations are possible without departing from the scope and spirit of the inventions disclosed herein, in that those inventions set forth in the claims below are intended to cover all variations and modifications of the inventions disclosed without departing from the spirit of the inventions. The terms "including:" and "having" come as used in the specification and claims shall have the same meaning as the term "comprising."

What is claimed is:

1. A peripherally-dampened blending blade assembly, comprising:
    a drive shaft;
    a blending blade attached to an end of the drive shaft and configured to rotate with the drive shaft;
    a circular motion guide positioned around the drive shaft;
    a container having a blade assembly opening;
    a first flexible seal positioned proximate a top of the blade assembly opening;
    a second flexible seal positioned proximate a bottom of the blade assembly opening;
    the first flexible seal and the second flexible seal being positioned circumferentially around the circular motion guide, an entirety of both the first flexible seal and the second flexible seal vertically overlapping a portion of the blending blade, the first flexible seal and the second flexible seal comprising a dampening material and preventing contact between all rigid surfaces of the container and all rigid surfaces holding the circular motion guide within the blade assembly opening of the container, the first and second flexible seals dampening vibrations resulting from blending;
    an upper housing partially positioned between the circular motion guide and the first flexible seal, the upper housing covering an entirety of an upper surface of the first flexible seal; and
    a lower housing partially positioned between the circular motion guide and the second flexible seal, the lower housing covering an entirety of a lower surface of the second flexible seal.

2. The blending blade assembly of claim 1, further comprising a circular motion guide seal positioned between the drive shaft and the upper housing, the circular motion guide seal sealing the circular motion guide.

3. The blending blade assembly of claim 1, wherein the upper housing is partially positioned between the blending blade and the first flexible seal.

4. A method of dampening impact forces between a blending blade assembly and a blending jar, the method comprising:
    providing a blending jar, the blending jar having a bottom opening;
    positioning a blade assembly in the bottom opening, the blade assembly comprising a blade positioned within the blending jar, a jar shaft extending through the bottom opening and attached to the blade, and a circular motion guide positioned around the jar shaft;
    dampening relative movement between the blade assembly as a whole and the blending jar, the dampening being achieved via a first flexible seal positioned proximate a top of the bottom opening and a second flexible seal positioned proximate a bottom of the bottom opening;
    housing the first flexible seal with an upper housing partially positioned between the circular motion guide and the first flexible seal, the upper housing covering an entirety of an upper surface of the first flexible seal; and
    housing the second flexible seal with a lower housing partially positioned between the circular motion guide and the second flexible seal, the lower housing covering an entirety of a lower surface of the second flexible seal;
    wherein the first flexible seal and the second flexible seal are positioned circumferentially around the circular motion guide, an entirety of the first seal and the second seal vertically overlapping a portion of the blade, the first flexible seal and the second flexible seal comprising a dampening material and preventing contact between all rigid surfaces of the container and all rigid surfaces holding the circular motion guide within the blade assembly opening of the container, the first and second flexible seals dampening vibrations resulting from blending.

5. The method of claim 4, further comprising sealing the bottom opening.

6. The method of claim 4, wherein the relative movement is induced by the blade impacting media held in the blending jar.

7. A peripherally-dampened blending blade assembly, comprising:
- a drive shaft;
- a blending blade attached to an end of the drive shaft and configured to rotate with the drive shaft;
- a circular motion guide positioned around the drive shaft, the circular motion guide having a rigid outer surface;
- a first seal positioned proximate a top of the blade assembly opening;
- a second seal positioned proximate a bottom of the blade assembly opening;
- the first seal and the second seal being positioned circumferentially around the circular motion guide, an entirety of the first seal and the second seal vertically overlapping a portion the blending blade, the first seal and the second seal contacting the rigid outer surface of the circular motion guide and the rigid opening surface of the blade assembly opening, the first seal and the second seal comprising a dampening material and configured to dampen movement of the rigid opening surface relative to the rigid outer surface, the first and second flexible seals dampening vibrations resulting from blending;
- an upper housing covering an entirety of an upper surface of the first seal; and
- a lower housing partially positioned between the circular motion guide and the second seal, the lower housing covering an entirety of a lower surface of the second seal.

8. The blending blade assembly of claim 7, wherein the container and the circular motion guide are connected to each other by the first seal and the second seal.

9. The blending blade assembly of claim 7, further comprising a plurality of additional seals, wherein a portion of the plurality of additional seals are rigid and a portion of the plurality of additional seals are flexible.

10. A peripherally-dampened blending blade assembly, comprising:
- a drive shaft;
- a blending blade attached to an end of the drive shaft and configured to rotate with the drive shaft;
- a circular motion guide positioned around the drive shaft;
- a seal assembly having a dampening material contacting the circular motion guide, the seal assembly being positioned circumferentially around the circular motion guide, an entirety of the seal assembly vertically overlapping a portion of the blending blade, the seal assembly being configured to contact a bottom wall of a blending jar, the seal assembly comprising a first seal proximate a top of the bottom wall and a second seal proximate a bottom of the bottom wall, the first and second seals dampening vibrations resulting from blending;
- an upper housing covering an entirety of an upper surface of the first seal; and
- a lower housing partially positioned between the circular motion guide and the second seal, the lower housing covering an entirety of a lower surface of the second seal.

11. The blending blade assembly of claim 10, wherein the first seal is spaced from the second seal.

12. The blending blade assembly of claim 10, wherein the seal assembly comprises a contact surface, the contact surface comprising a groove.

13. The blending blade assembly of claim 10, wherein the seal assembly is configured to simultaneously contact an upward-facing surface of the blending jar and a downward-facing surface of the blending jar.

14. The blending blade assembly of claim 10, wherein the seal assembly comprises a surface, the surface having a plurality of protrusions extending therefrom.

* * * * *